July 10, 1945.   C. F. CRUMB ET AL   2,380,295
CORN SHELLER
Filed March 8, 1943   2 Sheets-Sheet 1
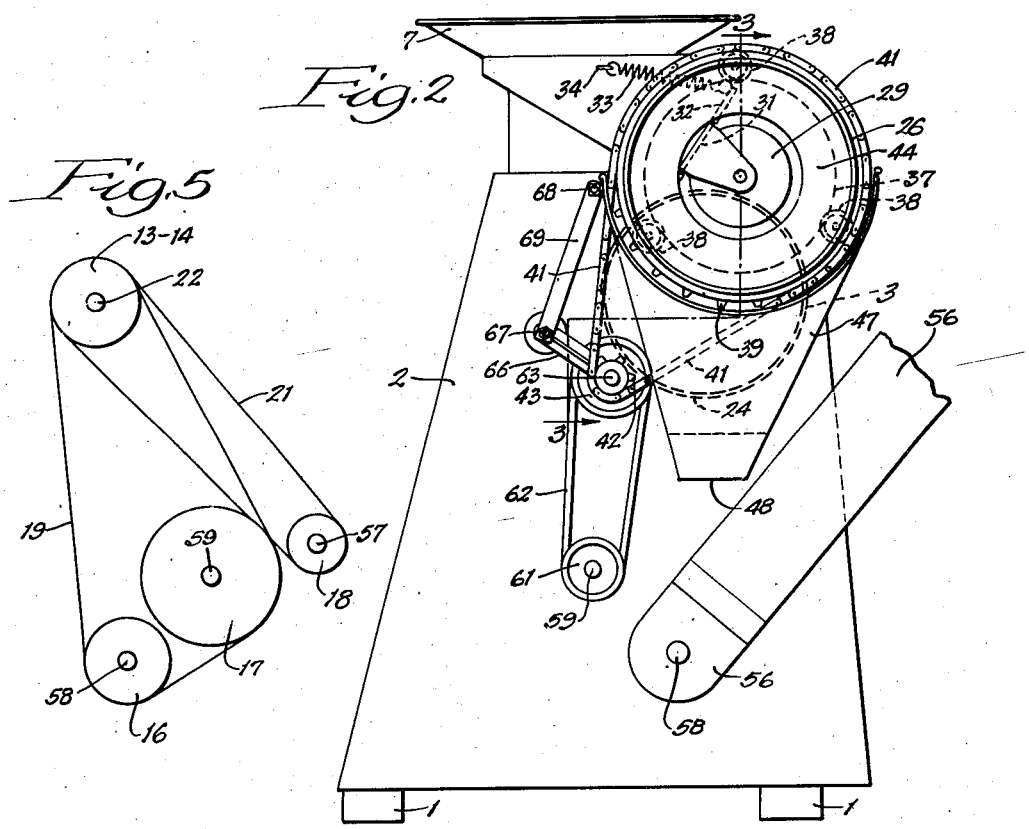
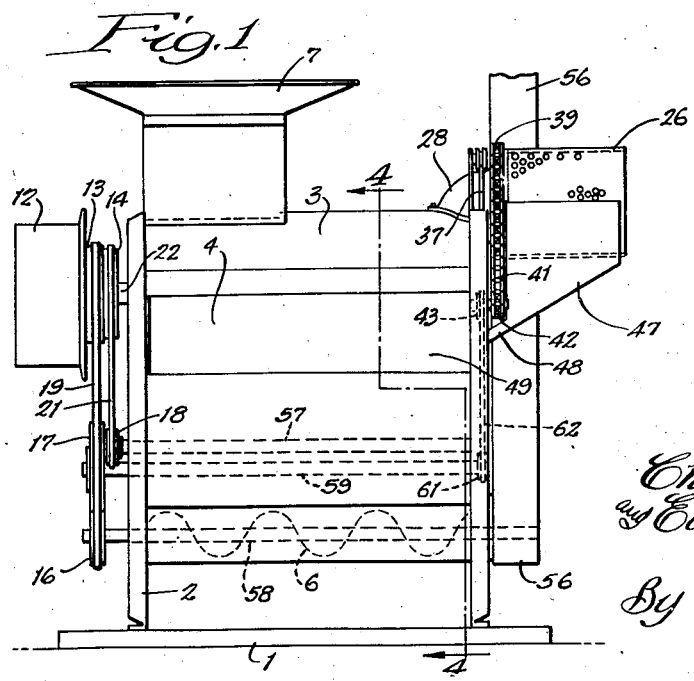
Inventors:
Charles F. Crumb
and Edward R. Gerber,
By Paul O. Pippel
Attorney.

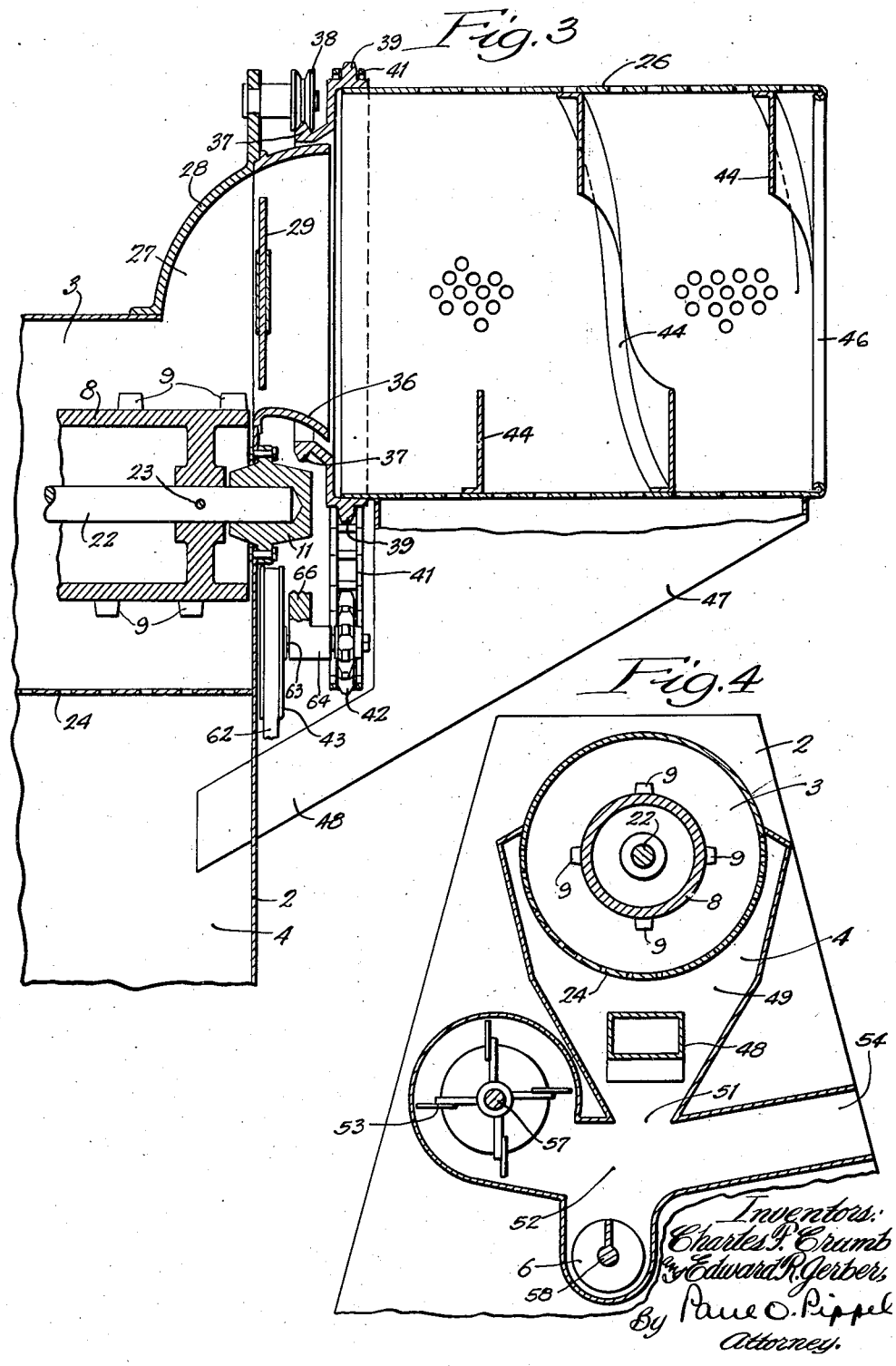

Patented July 10, 1945

2,380,295

UNITED STATES PATENT OFFICE 2,380,295

CORN SHELLER

Charles F. Crumb, Clarendon Hills, and Edward R. Gerber, Chicago, Ill., assignors to International Harvester Company, a corporation of New Jersey Application March 8, 1943, Serial No. 478,376

6 Claims. (Cl. 130—6)

This invention relates to a new and improved corn sheller and has for one of its principal objects the provision of a rotary screen for effecting the recovery of corn expelled from the shelling chamber with the cobs.

Heretofore, any corn that passed out of the cob outlet in the shelling chamber with the cobs was salvaged by passing the mixture of cobs and corn through a vibrating screen instead of by means of the rotary screen.

An important object of this invention is to provide means for recombining the salvaged corn with the regularly shelled corn.

A further important object of this invention is the provision of means for returning shelled corn from the rotary screen back into the cleaning mechanism of the sheller proper.

Another important object of this invention is to provide a cob discharge at a point above the shelling chamber and especially to equip the discharge with yieldable means to create a back pressure on the cobs leaving the shelling chamber.

A still further important object of this invention is to provide a cob discharge spout from the shelling chamber which forms a joint with the rotary screen.

Another and still further important object of this device is to provide a corn sheller having a rotary screen corn-recovery cylinder and possessing novel means for driving the cylinder.

Other and further important objects of this invention will become apparent from the disclosures in the following specification and accompanying drawings, in which:

Figure 1 is a side elevation of the corn sheller of this invention;

Figure 2 is an end view of the corn sheller as shown in Figure 1;

Figure 3 is an enlarged sectional view taken on the line 3—3 of Figure 2 and showing the rotary screen;

Figure 4 is a sectional view taken on the line 4—4 of Figure 1; and

Figure 5 is a schematic showing of the driving and driven members of this corn sheller.

As shown in the drawings, the reference numeral 1 indicates generally a supporting base for the corn sheller of this invention and has mounted thereon a housing 2 which encloses a main shelling chamber 3, a cleaning chamber 4, and a corn screw conveyer 6. The ears of corn to be shelled are inserted in a hopper 7 which permits entrance of the ears to the shelling chamber 3. The shelling chamber 3 is best shown in Figure 3 and includes a centrally mounted shelling roll 8 having projecting lugs or the like 9. The shelling roll is shown journally mounted within a bearing 11 at its right end.

The corn sheller is operated by some external power source and is connected thereto by means of a flat belt engaging a wide pulley 12, as shown in Figure 1, or other suitable driving means. This pulley 12 in turn drives the integral V-belt sheaves 13 and 14, and these, in turn, drive sheaves 16, 17, and 18 by means of V-belts 19 and 21 shown in greater detail in Figure 5. A shaft 22, on which is mounted the pulley 12 and its unitary sheaves 13 and 14, is the same shaft which runs centrally of the shelling roll 8 and to which the shelling roll is rigidly attached by means of pins 23 or the like, thereby causing the shelling roll to rotate within the shelling chamber 3. The shelling chamber 3 has a perforated or screened bottom plate 24 of semicylindrical shape, which permits passage of corn kernels and other small particles, such as dust, dirt, or the like, but retains the shelled cobs within the shelling chamber 3. As the ears of corn are inserted in the hopper 7, they are thrown around within the shelling chamber by rotation of the shelling roll 8, and, as they rub against each other and the lugs or teeth 9 strike the kernels, they are loosened and severed from the cob so that, by the time the cobs reach the far end of the shelling chamber 3, the corn is removed therefrom.

The cobs pass out from the top portion of the shelling chamber 3 through an aperture 27. A spout 28 is affixed over the aperture 27 to guide the cobs to a rotary screen 26. Within the mouth of the spout 28 is a spring-retained, hinged gate 29. As best shown in Figure 2, the gate 29 is hinged at 31, and an angle extension of a hinge shaft 32 supplies the attaching means for a spring 33 having its other end attached to the housing 2 at 34. The hinged gate 29 prevents cobs from being violently thrown from the shelling chamber 3 and supplies the back pressure needed to hold the cobs in the shelling chamber 3 until such time as they are completely shelled, and, when the pressure on the gate 29 is sufficient to overcome the force exerted by the spring 33, the gate swings open and permits cobs to pass out slowly so that they drop directly to the peripheral walls of the rotary screen 26 and are never thrown completely through the rotary screen 26, as would be the case if no gate 29 was employed. The spout 28 is sufficiently long so that its outer end 36 forms a telescopic joint within the rotary screen 26 and thus prevents the corn or cobs from escaping from the rotary screen or becoming lodged in the operating mechanism for the rotary screen.

The rotary screen 26 is provided at its inner end with a reduced diameter, annular V-shaped track 37, around which three equally spaced roller bearing guides 38 are mounted, as shown in Figures 2 and 3. These roller bearing guides 38 form a support for the rotary cylindrical screen 26 as well as permit rotation of the screen. Parallel with and closely adjacent the annular track 37 are spur teeth 39 positioned around the outer periphery of the cylinder 26. A chain 41 drives the screen 26 through a sprocket 42, which is, in turn, driven by a sheave 43.

The rotary cylindrical screen 26 is equipped with internal spiral ribs 44 which act to guide the cobs from the inner end of the screen to the outer end 46, whereupon they are dropped out of the cylinder into any type of receptacle as desired. The spiral ribs 44 also tend to prevent cobs from flying from the entrance to the exit without being rolled around in the screen 26. The kernels of corn passing out the perforations in the screen 26 are received by a receptacle 47, which is equipped with a funnel-like member 48, which extends downwardly, across, and back into the cleaning chamber 4 of the sheller proper. It will be seen that kernels of corn from the shelling chamber drop into the cleaning chamber through the foraminous member 24, and the kernels of corn from the rotary cylindrical screen are brought to the cleaning chamber through the trough 48, thereby supplementing the shelled corn and providing merely for one cleaning.

It is, therefore, an important feature of this invention to provide cleaning means for the salvaged corn simultaneously with that falling from the shelling cylinder.

The cleaning chamber 4 is best shown in Figure 4, wherein it is seen that the upper portion of the chamber substantially defines a hopper 49 which surrounds the foraminous lower plate 24 of the main shelling chamber 3. It will be noted that this cleaning device is not necessarily an integral part of the corn sheller, but the device will act as a sheller and combine the corn salvaged by the rotary screen with the corn dropping from the shelling chamber without this supplementary cleaning device hereafter described. The trough or funnel member 48 projects into the hopper portion 49 of the cleaning chamber 4, and the kernels of corn fall downwardly together through a restricted aperture 51 in the lower end of the hopper element 49 and thereupon pass through the dirt-separating passage 52. A fan 53 rotates at a high rate of speed and causes a current of air to proceed at a high velocity through the dirt-separating chamber 52. As the kernels of corn and other foreign matter, such as dirt, small pieces of broken cobs, or even portions of husks, fall through the chamber 52, the high velocity air currents separates these lighter foreign particles from the kernels of corn, which are heavier and therefore drop through the chamber 52, whereas the foreign particles are carried by the air currents out through an exhaust passage 54 to the atmosphere or to some receptacle provided for waste matter. The kernels of corn drop through the separating chamber 52 into the screw conveyer 6, which, upon rotating, carries the corn to the end of the screw to an elevator 56, best shown in Figures 1 and 2. The elevator 56 is provided with the usual chain drive having buckets or slats (not shown) which elevate the kernels of corn to a point where they fill a bin, sack, or other receptacle.

The fan 53 is mounted on a shaft 57, being driven by the sheave 18, as best shown in Figure 1. The worm conveyer 6 is mounted integrally with a shaft 58 and is driven by the sheave 16 which, in turn, operates the elevator 56. The sheave 17, driven by the belt 19 from the sheave 13, is keyed to a shaft 59 which extends entirely across the corn-shelling machine, as shown in Figures 1 and 2, and has a sheave 61 keyed thereto. The sheave 61 drives the sheave 43 by means of a V-belt 62. The sheave 43 and the small sprocket 42 are mounted on a floating shaft 63, as best shown in Figure 2. The shaft 63 is provided with a concentric, centrally located sleeve 64, as shown in Figure 3, and this sleeve 64 has an arm 66 which is allowed to pivot about a stub shaft 67 which has its outer end supported from a point 68, by reason of a brace arm 69. It will be seen that the sheave 43 and the sprocket 42 are free to float through an arc defined by the arm 66 about the stub shaft 67 as required by the tensioning of the chain 41 and the V-belt 62.

We are aware that numerous details of construction may be varied throughout a wide range without departing from the principles disclosed herein, and we, therefore, do not propose limiting the patent granted thereon otherwise than as necessitated by the prior art.

What is claimed is:

1. A corn sheller, comprising a shelling chamber, a rotating roll having projecting lugs within said shelling chamber, a perforated under plate for said shelling chamber, a corn cleaning chamber beneath said perforated plate, the top of the shelling chamber having a cob-removing aperture, a spout covering said aperture having a mouth at right angles to said aperture, a rotary cylindrical screen, said spout communicating with said rotary screen, spiral ribs fixedly attached internally of the said rotating screen, a receptacle beneath said rotary cylindrical screen, and a trough extending downwardly from said receptacle into said cleaning chamber.

2. A corn sheller, comprising a shelling chamber, a shelling cylinder rotating in said shelling chamber, an apertured plate under said chamber, a corn cleaning chamber beneath said apertured plate, said shelling chamber having an aperture near the top thereof, a rotary screen, a spout covering the aperture in the shelling chamber and having its mouth telescoping the rotary screen, and a return trough beneath said rotary screen extending to said cleaning chamber, whereby shelled corn from the shelling chamber and from the rotary screen is cleaned simultaneously.

3. A corn sheller, comprising a main cylindrical shelling chamber, a rotor within said shelling chamber, a semi-cylindrical foraminous under side for said shelling chamber, a corn cleaning chamber beneath and enclosing said foraminous member, the said shelling chamber having an exit in the upper end portion thereof for the removal of shelled cobs, a rotary screen, a spout covering the exit in said shelling chamber and projecting therefrom parallel with the shelling rotor and telescoping into the rotary screen, and a return conduit beneath said rotary screen leading to said cleaning chamber.

4. A corn sheller, comprising a main cylindrical shelling chamber, a rotor within said shelling chamber, a semi-cylindrical foraminous under side for said shelling chamber, a corn cleaning chamber beneath and enclosing said foraminous member, the said shelling chamber having an exit in the upper and end portion thereof for the removal of shelled cobs, a rotary screen, a spout covering the exit in said shelling chamber and projecting therefrom parallel with the shelling rotor and telescoping the rotary screen, a yieldable gate within the mouth of said spout, and a conduit beneath said rotary screen leading to said cleaning chamber, whereby cobs leaving the shelling chamber through the spout are restrained by said yieldable gate within the shelling chamber until a sufficient number of cobs have accumulated to produce maximum shelling by rubbing and bumping of the cobs together and also to prevent rapid escape of the cobs from the shelling chamber to the rotary screen.

5. A corn sheller, comprising a main cylindrical shelling chamber, a rotor within said shelling chamber, a semi-cylindrical foraminous under side for said shelling chamber, a corn cleaning chamber beneath and enclosing said foraminous member, the said shelling chamber having an exit in the upper portion thereof for the removal of shelled cobs, a rotary screen, a spout covering the exit in said shelling chamber and projecting therefrom parallel with the shelling rotor and telescoping into the rotary means, a return receptacle beneath said rotary screen leading to said cleaning chamber, and a spring-retained hinged gate within the mouth of said spout.

6. A corn sheller, comprising a housing, a shelling chamber having a screen on its under side, a corn cleaning chamber beneath said screen, a rotary screen, a conduit between the upper portion of said shelling chamber and said rotary screen, a return trough beneath said rotary screen leading to said cleaning chamber, sprocket teeth positioned around the periphery of the said rotary screen, a chain around said teeth, a driven arcuately movable sprocket on said corn sheller housing adapted to drive said chain, an annular track integral with said rotary screen, and complementary rotary track bearing members positioned at points around the annular track and affixed to said corn sheller housing.

CHARLES F. CRUMB.
EDWARD R. GERBER.